US008721175B2

(12) United States Patent
Cordeiro et al.

(10) Patent No.: US 8,721,175 B2
(45) Date of Patent: May 13, 2014

(54) FASTENING APPARATUS WITH ENGINE AND CARTRIDGE THERMISTORS

(75) Inventors: Pierre Cordeiro, Livron sur Drome (FR); Guy Jaillet, La Roche de Glun (FR); Christian Ricordi, Bourg les Valence (FR)

(73) Assignee: Societe de Prospection et d'Inventions Techniques SPIT, Bourg les Valence (FR)

( * ) Notice: Subject to any disclaimer, the term of this patent is extended or adjusted under 35 U.S.C. 154(b) by 220 days.

(21) Appl. No.: 13/051,079

(22) Filed: Mar. 18, 2011

(65) Prior Publication Data

US 2011/0235679 A1 Sep. 29, 2011

(30) Foreign Application Priority Data

Mar. 23, 2010 (FR) ...................................... 10 52104

(51) Int. Cl.

| | |
|---|---|
| ***G01K 1/00*** | (2006.01) |
| ***G01K 13/00*** | (2006.01) |
| ***G01K 7/00*** | (2006.01) |

(52) U.S. Cl.

USPC ........... 374/208; 374/144; 374/183; 374/166; 374/148

(58) Field of Classification Search

USPC .......................... 374/208, 144, 183, 166, 148

See application file for complete search history.

(56) References Cited

U.S. PATENT DOCUMENTS

| | | | | |
|---|---|---|---|---|
| 4,034,733 | A * | 7/1977 | Noguchi et al. | 123/268 |
| 6,095,111 | A * | 8/2000 | Ueda et al. | 123/254 |
| 6,286,492 | B1 * | 9/2001 | Kanno | 123/684 |
| 6,305,346 | B1 * | 10/2001 | Ueda et al. | 123/259 |
| 6,840,235 | B2 * | 1/2005 | Koseki et al. | 123/568.14 |
| 7,295,912 | B2 * | 11/2007 | Yasui et al. | 701/103 |
| 2005/0133001 | A1 * | 6/2005 | Kaneko | 123/299 |
| 2007/0267456 | A1 * | 11/2007 | Toulouse et al. | 227/9 |
| 2007/0290020 | A1 | 12/2007 | Wolf et al. | |
| 2009/0314817 | A1 | 12/2009 | Moeller et al. | |
| 2010/0192906 | A1 * | 8/2010 | Johnson | 123/306 |
| 2010/0312458 | A1 * | 12/2010 | Hacker et al. | 701/103 |
| 2011/0083652 | A1 * | 4/2011 | Fuhrmann et al. | 123/691 |
| 2011/0094208 | A1 * | 4/2011 | Bauer et al. | 60/276 |
| 2012/0055143 | A1 * | 3/2012 | Asanuma et al. | 60/301 |
| 2012/0222651 | A1 * | 9/2012 | Gentile | 123/347 |

FOREIGN PATENT DOCUMENTS

| | | |
|---|---|---|
| JP | 2870771 | 12/2005 |

OTHER PUBLICATIONS

French Search Report for Application No. 1052104 mailed Oct. 19, 2010.

* cited by examiner

*Primary Examiner* — Mirellys Jagan

(74) *Attorney, Agent, or Firm* — Lowe Hauptman & Ham LLP

(57) ABSTRACT

The fastening apparatus for fastening elements includes a combustion chamber, a housing for a gas cartridge, means for injecting gas from a cartridge into the combustion chamber and a management module. An engine thermistor is provided to be subjected to the temperature of the chamber, as well as a second cartridge thermistor intended to be subjected to the temperature of the gas cartridge disposed in the cartridge housing. Both thermistors are mounted for transmitting their temperature information to the management module. The management module is operable for managing temperature information and determining the opening time of the injection means.

19 Claims, 2 Drawing Sheets

FASTENING APPARATUS WITH ENGINE AND CARTRIDGE THERMISTORS

RELATED APPLICATIONS

The present application is based on, and claims priority from, France Application Number 1052104, filed Mar. 23, 2010, the disclosure of which is hereby incorporated by reference herein in its entirety.

BACKGROUND

The invention relates to fastening apparatuses with fastening elements driven by a piston propelled in a cylinder of an internal combustion engine, forming, with a cylinder head, a combustion chamber wherein a mixing, draining and cooling fan is provided. Indeed, the fan first enables the flammable gas and air mix to be obtained; it also enables the combustion chamber to be drained from combustion residues; finally, the fan also enables all the members which may have been heated upon the shot to be cooled, specially the cylinder, the piston, the cylinder head and other elements making up the combustion chamber.

Until recently, the sum of the draining and cooling durations, after the shot, during which the fan is still rotatably driven, was determined upon the design of the apparatus and set in the factory.

Thermal facts were not taken into account.

The applicant has already sought to improve the cooling conditions of the fastening apparatuses introduced thereabove, by seeking to take advantage of the motor of the fan being connected to an electronic management module and to the supply battery for the apparatuses.

Thus, from the application FR 2,870,771, there is known an apparatus with fastening elements driven by a piston mounted within a cylinder of an internal combustion engine and forming, with an cylinder head, a combustion chamber wherein a gas-air mixing, draining and cooling fan is provided, being associated with a driving electric motor connected to an electronic management module and a supply battery, a thermistor being provided in the vicinity of the fan motor for transmitting a temperature information to the management module.

The management module which, advantageously, includes a processor, manages the temperature information provided by the thermistor for determining the operating duration of the fan after the shot as a function of this temperature, for example using a ventilation duration and temperature table.

The improvement provided in FR 2,870,771, with a thermistor subjected to the temperature of the chamber, is already very interesting. The applicant has however gone further by seeking to inject into the combustion chamber a gas mass better adapted to the air temperature of the chamber, and therefore adapted to any thermal condition of the apparatus.

SUMMARY OF THE INVENTION

Accordingly, the applicant now proposes a fastening apparatus with fastening elements driven by a piston mounted within a cylinder for an internal combustion engine and forming, with a cylinder head, a combustion chamber, the apparatus including a housing, for a gas cartridge, means for injecting gas from a cartridge into the combustion chamber and a management module, with a thermistor being provided to be submitted to the temperature of the chamber, with a second thermistor cartridge being provided to be submitted to the temperature of the gas cartridge disposed in the cartridge housing, both thermistors being mounted for transmitting their temperature information to the management module, the apparatus being characterised in that the management module is operable for managing the temperature information and determining the opening time of the injection means.

The opening time of the injection means, generally a solenoid valve, even though it can also be a piezoelectric injector, is determined using a) the gas mass to be injected into the chamber, determined using the first thermistor, and b) the solenoid valve flow rate, determined using the second thermistor, the opening time being obtained by the ratio:

$$\frac{a}{b}$$

Indeed, the first thermistor, provided close to the chamber, gives an indication of the air temperature in the chamber and therefore the amount of gas to be injected for the mix richness, and therefore the power, to be appropriate.

The second thermistor, provided close to the gas cartridge without being disturbed by the thermal engine, provides an indication of the cartridge temperature and therefore of the cartridge fuel (gas). Knowing the fuel temperature enables the flow rate of the injection means at the considered temperature to be determined.

Using the invention, the fuel mass injected into the combustion chamber is well adapted to the air temperature in the chamber. Thus, fuel consumption, pollutant production and eventually power loss are reduced when the apparatus heats up.

There was known, from the patent application US 2009/314817, an apparatus comprising two thermistors and a management module. However, the management module has not the same function as in the invention of the present application, in the sense it only allows determining an ignition delay.

In a first embodiment, the cartridge housing extends substantially in parallel to the piston, in the apparatus casing, the thermistor is implanted into the combustion chamber and the cartridge thermistor is implanted into the cartridge housing.

In a second embodiment of the fastening apparatus of the invention, the cartridge housing is provided in an arm which extends substantially in parallel to the piston, the arm of the cartridge housing being directly connected to the apparatus casing by a handle for accommodating the management module, the thermistor is implanted into the portion of the end of the handle close to the casing of the apparatus and the cartridge thermistor is implanted into the cartridge housing.

In this case, the detent of the apparatus being in the portion of the handle close to the casing and the apparatus including a chamber lock arranged for cooperating with the chamber through an opening in the casing extending between the detent and the chamber, the thermistor is implanted into the handle in proximity with the detent.

Thus, if the fan keeps on rotating and if the combustion chamber is opened, the engine thermistor, already away from the chamber, is not disturbed by the fan flow, while still being subjected to the temperature of the chamber.

In other words, the thermistor is connected to the chamber by a thermal bridge.

BRIEF DESCRIPTION OF THE DRAWINGS

The invention will be better understood using the following description of two embodiments of the fastening apparatus of the invention, referring to the appended drawing, in which.

DESCRIPTION OF SOME EMBODIMENTS

Figure 1:
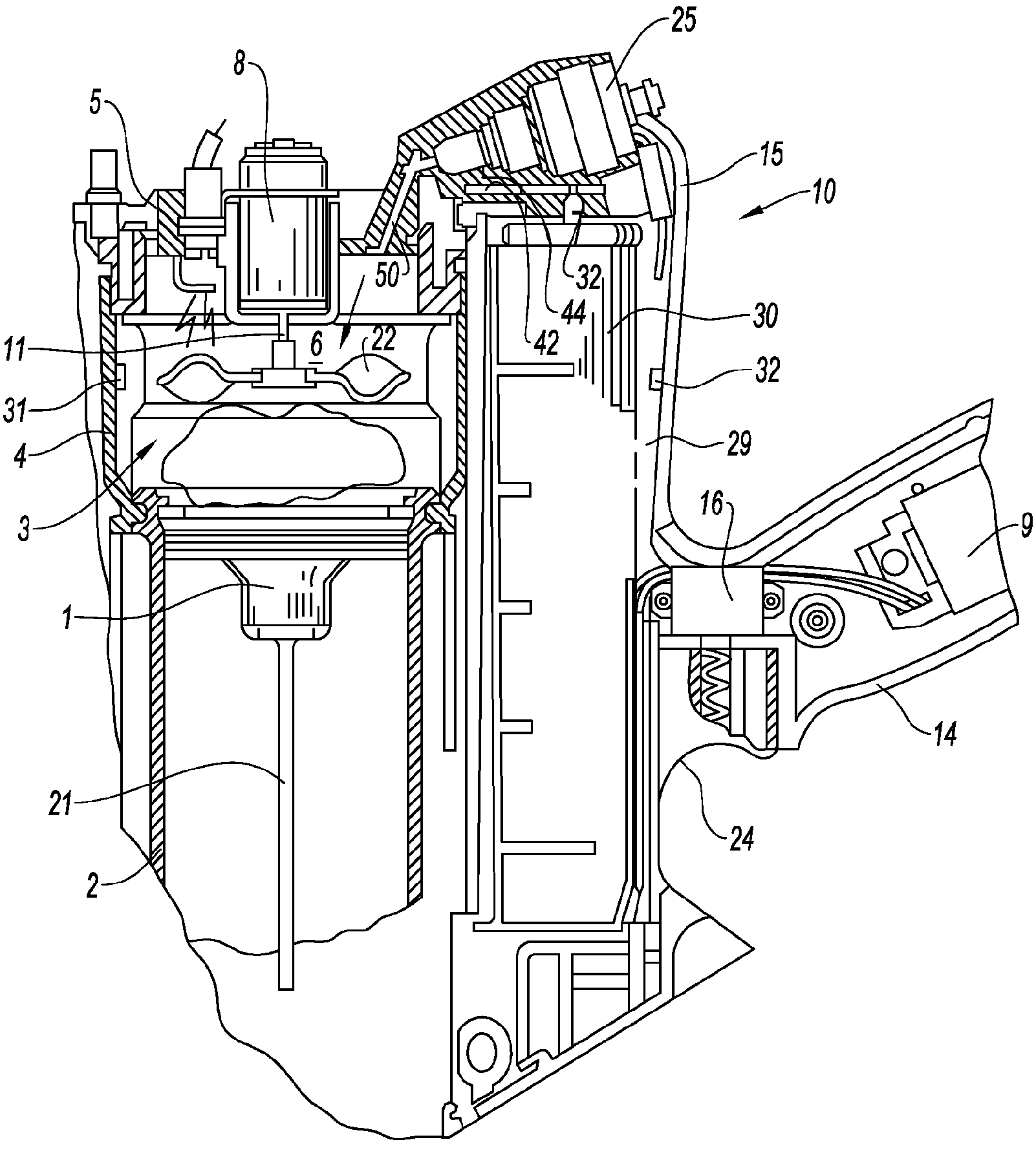
FIG. 1 is a section cutaway view of the first embodiment of the apparatus of the invention, with a gas cartridge housing provided in the casing of the apparatus.

The apparatus 10 which will be now described referring to FIG. 1, similarly conventional in almost all its elements, is an apparatus for driving fastening elements with a piston 1, a propelling rod 21 being integral therewith, the piston 1 being mounted into a cylinder 2 of an internal combustion engine 3, the cylinder 2 forming, with a sliding sleeve 4 and a cylinder head 5, a combustion chamber 6. A fan 22 is provided into the chamber 6 for providing a mixing function and obtaining a good flammable mix, a draining function for draining the combustion chamber from the combustion residues as well as a cooling function for the members which have been heated up upon the shot.

The fan 22, in a known manner per se, is rotatably driven by an engine 8 about the axis 1 to which it is mounted, the engine being mounted into the cylinder head 5 and connected to a battery, not shown, and to an electronic management module 9 provided in a handle 14 of the apparatus, which handle is connected to the casing 15 of the apparatus. In the connecting area of the handle to the casing, the detent 24 is provided with the control device 16 thereof.

The apparatus 10 includes, here extending substantially in parallel to the axis of the apparatus merged with the piston rod 21, a housing 29 for a gas cartridge 30, here already introduced into the housing 29.

Behind the apparatus, in the cylinder head 5, a solenoid valve 25 is mounted for metering and injecting gas from the cartridge 30 into the combustion chamber 6 of the apparatus, the gas, substantially in a liquid phase in the cartridge 30, flowing in a vapour phase into the chamber 6, through ducts 32, 42, 44, upstream from the solenoid valve, and a duct 50, located between the solenoid valve 25 and the chamber 6.

Against the inside wall of the chamber sleeve 4, is mounted a first thermistor 31, which is a so-called engine thermistor intended to be subjected to the temperature of the chamber 6.

Against the inside wall of the casing 15, in the cartridge housing 29, is mounted a second thermistor 32, which is a so-called cartridge thermistor, intended to be subjected to the temperature of the cartridge 30. Both thermistors are intended to transmit their information to the management module for determining, not only the operating duration of the fan 22 after the shot, but also the opening time of the solenoid valve 25. Such opening time is equal to the ratio of a) the gas mass to be injected into the chamber 6, determined using the engine thermistor 31, to b) the flow rate of the solenoid valve 25 determined using the cartridge thermistor 32.

By way of example, if the temperature of the chamber and the temperature of the cartridge are both 20 degrees Celsius, $a=26.10^{-6}$ kg, b=2 g/s or, which is better, 2 mg/ms.

Then, the opening time t is given by the ratio:

$$t = \frac{a}{b} = 13 \text{ ms}$$

Figure 2:
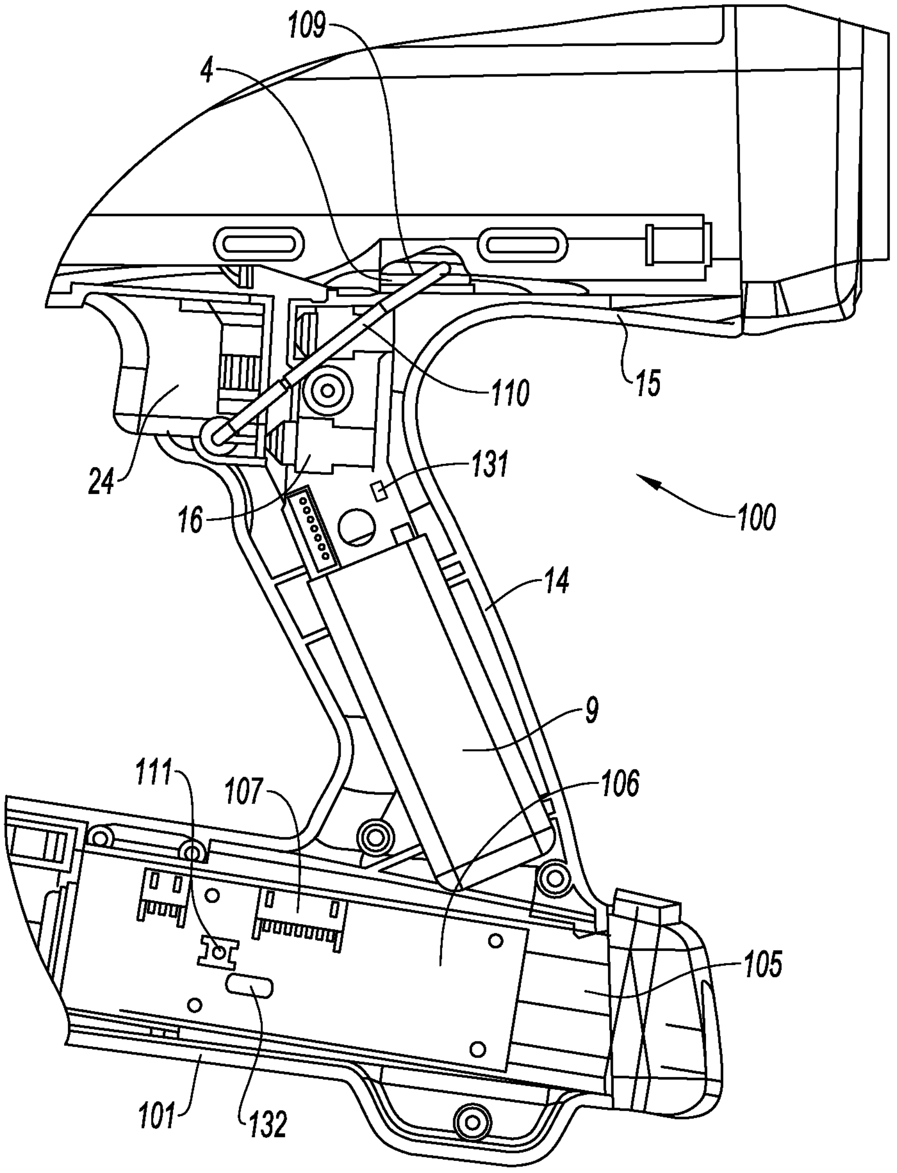
FIG. 2 is a simplified inner view of the second embodiment of the apparatus of the invention, with a gas cartridge housing provided in an arm outside the casing of the apparatus.

Referring to FIG. 2, wherein the same means as those of the embodiment of FIG. 1 are associated with the same reference numerals, in the apparatus of the invention 100, in the second embodiment thereof, the cartridge is lodged in an arm 101 which extends substantially in parallel to the piston rod, from i) a fastening element feeder, not shown, connected to the casing 15 of the apparatus in the area of a shearing block in the rear of a tip-guide, not shown either, to ii) the handle 14, which extends substantially in parallel to the feeder. The arm 101 is the housing of the battery 105 of the apparatus as well as the housing of the gas cartridge. The handle 14 is the housing of the electronic management module block 9.

The management module 9, as in the first embodiment of FIG. 1, includes a processor which, in particular, manages the temperature information of the thermistors discussed thereafter. There is also shown, in the arm 101, a printed circuit board 106 carrying gas level, battery charge level and apparatus status indicators. Such indicators herein are light-emitting diodes controlled by a push-button 111, accessible through the shell of the arm 101.

The board 106 includes an output connector 107 connected to the electronic management block 9.

In the casing 15, is provided an opening door 109, through which extends a chamber lock 110 integral with the detent 24, for cooperating with the outside wall of the chamber sleeve 4 and locking the same in the closing position. All these locking means are well known from the person skilled in the art.

The engine thermistor 131 herein is implanted into the handle 14, in proximity with the controller 16 of the detent 24. The thermistor 131 is directly connected to the electronic block 9.

The cartridge thermistor 132 is herein implanted on the board 106, in the arm 101, and it is connected to the outer connector 107.

When the combustion chamber is opened, the engine thermistor 131 is subjected to the temperature thereof by conduction. When it is opened and the apparatus is drained, the thermistor 131 remains subjected to the temperature, but by convection.

The temperature indication provided by the thermistor 131 always remains very good because it is connected to the combustion chamber through a thermal bridge.

The invention claimed is:

1. A fastening apparatus with fastening elements driven by a piston mounted within a cylinder of an internal combustion engine and forming, with a cylinder head, a combustion chamber, the apparatus including a housing, for a gas cartridge, means for injecting gas from the gas cartridge into the combustion chamber, and a management module, with a first thermistor being provided to be subjected to the temperature of the chamber, a second thermistor being provided to be subjected to the temperature of the gas cartridge disposed in the cartridge housing, both thermistors being mounted for transmitting their respective temperature information to the management module, the apparatus being characterized in that the management module is operable for managing the temperature information and determining an opening time of the means for injecting gas.

2. The fastening apparatus according to claim 1, wherein the second thermistor is a cartridge thermistor.

3. The fastening apparatus according to claim 1, wherein the cartridge housing extends substantially in parallel to the piston in a casing of the apparatus, the first thermistor is implanted into the combustion chamber and the second thermistor is implanted into the cartridge housing.

4. The fastening apparatus according to claim 3, wherein the second thermistor is a cartridge thermistor.

5. The fastening apparatus according to claim 1, wherein the cartridge housing is provided in an arm which extends substantially in parallel to the piston, the arm of the cartridge housing being directly connected to a casing of the apparatus by a handle for accommodating the management module, the first thermistor is implanted into the portion of the handle close to the casing of the apparatus and the second thermistor is implanted into the cartridge housing.

6. The fastening apparatus according to claim 5, wherein the second thermistor is a cartridge thermistor.

7. The fastening apparatus according to claim 5, wherein the second thermistor is mounted on an integrated circuit board provided in the arm for accommodating the cartridge.

8. The fastening apparatus according to claim 7, wherein the second thermistor is a cartridge thermistor.

9. The fastening apparatus according to claim 5, wherein the apparatus includes a detent being in the portion of the handle close to the casing and the apparatus including a chamber lock arranged for cooperating with the chamber through an opening in the casing extending between the detent and the chamber, the first thermistor is implanted in the handle in proximity with the detent.

10. The fastening apparatus according to claim 9, wherein the second thermistor is a cartridge thermistor.

11. The fastening apparatus according to claim 5, wherein the first thermistor is connected to the combustion chamber through a thermal bridge.

12. The fastening apparatus according to claim 11, wherein the second thermistor is a cartridge thermistor.

13. A fastening apparatus comprising:

an internal combustion engine including:
- a piston;
- a cylinder, wherein the piston is mounted within the cylinder; and
- a cylinder head, wherein the cylinder head, the cylinder and the piston form a combustion chamber, a cartridge housing configured to receive a gas cartridge;

a injection system configured to inject gas from the gas cartridge into the combustion chamber when the gas cartridge is received in the housing;

a management module;

a first thermistor located such that the first thermistor senses a temperature of the chamber; and a second thermistor located such that the second thermistor senses a temperature of the gas cartridge disposed in the cartridge housing, wherein the fastening apparatus is configured such that the first thermistor and the second thermistor transmit respective temperature information indicative of the respective sensed temperatures to the management module, the management module is configured to determine an opening time of the injection system based on the respective temperature information transmitted to the management module, and wherein the fasting apparatus is configured to drive fastening elements via actuation of the piston mounted within the cylinder of the internal combustion engine.

14. The fastening apparatus according to claim 13, wherein the second thermistor is a cartridge thermistor.

15. The fastening apparatus according to claim 13, wherein the cartridge housing extends substantially in parallel to the piston in a casing of the apparatus, the first thermistor is implanted into the combustion chamber and the second thermistor is implanted into the cartridge housing.

16. The fastening apparatus according to claim 13, wherein the fastening apparatus includes a handle for accommodating the management module and an arm which extends substantially in parallel to the piston, the arm being directly connected to a casing of the apparatus by the handle for accommodating the management module, wherein the cartridge housing is provided in the arm, and wherein the first thermistor is implanted into the portion of the handle close to the casing of the apparatus and the second thermistor is implanted into the cartridge housing.

17. The fastening apparatus according to claim 16, further comprising an integrated circuit board provided in the arm for accommodating the cartridge, wherein the thermistor is mounted on the integrated circuit board.

18. The fastening apparatus according to claim 16, wherein the apparatus includes a detent being in the portion of the handle close to the casing and the apparatus includes a chamber lock arranged for cooperating with the chamber through an opening in the casing extending between the detent and the chamber, wherein the first thermistor is implanted in the handle in proximity with the detent.

19. The fastening apparatus according to claim 16, wherein the first thermistor is connected to the combustion chamber through a thermal bridge.

* * * * *